No. 637,133. Patented Nov. 14, 1899.
H. KUPSCH.
OPEN DIE HEAD.
(Application filed May 22, 1899.)
(No Model.) 2 Sheets—Sheet 1.
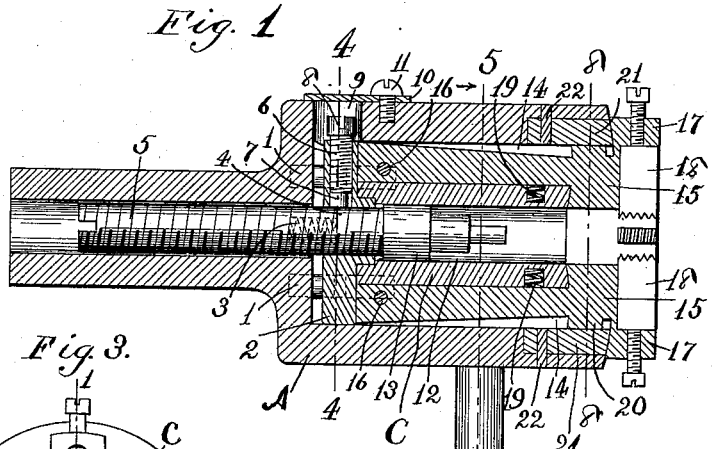
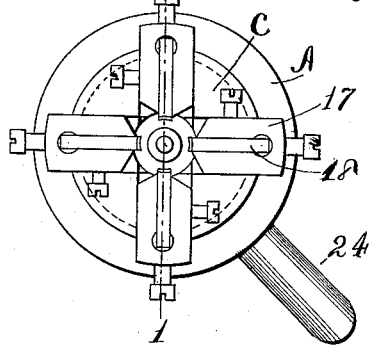
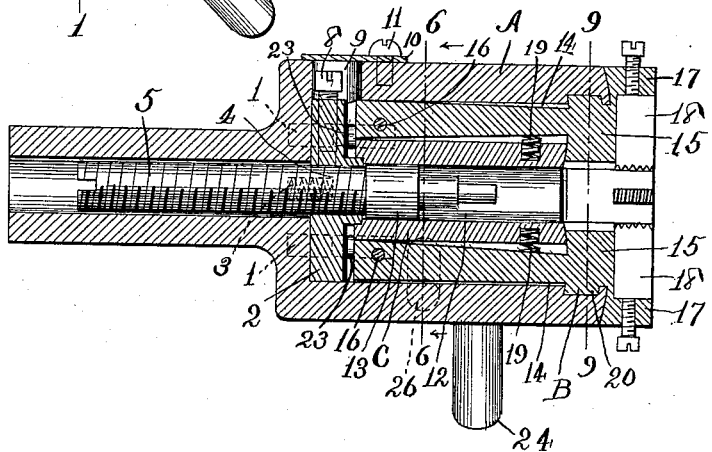
Witnesses:
Inventor:
Hermann Kupsch
By Rudolph ... Atty.

No. 637,133. Patented Nov. 14, 1899.
H. KUPSCH.
OPEN DIE HEAD.
(Application filed May 22, 1899.)
(No Model.) 2 Sheets—Sheet 2.

UNITED STATES PATENT OFFICE.

HERMANN KUPSCH, OF CHICAGO, ILLINOIS.

OPEN DIE-HEAD.

SPECIFICATION forming part of Letters Patent No. 637,133, dated November 14, 1899.

Application filed May 22, 1899. Serial No. 717,733. (No model.)

*To all whom it may concern:*

Be it known that I, HERMANN KUPSCH, a citizen of the United States, residing at Chicago, in the county of Cook and State of Illinois, have invented certain new and useful Improvements in Open Die-Heads; and I do hereby declare the following to be a full, clear, and exact description of the invention, such as will enable others skilled in the art to which it appertains to make and use the same.

My invention relates to a novel construction in a so-called "open" die-head or screw-threading attachment for lathes, the object being to provide a device of this character which is practically dust-proof and which will not readily wear out; and it consists in the features of construction and combinations of parts hereinafter fully described and claimed.

Figure 4:
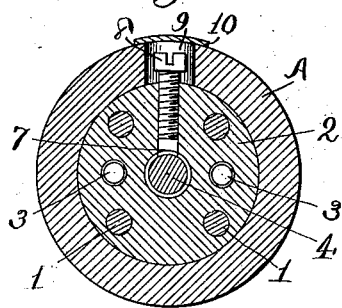
Figure 5:
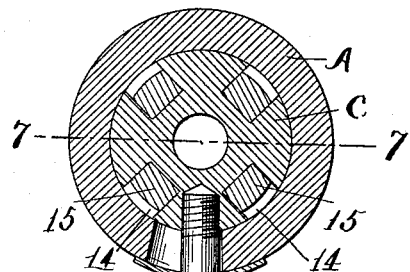
Figure 6:
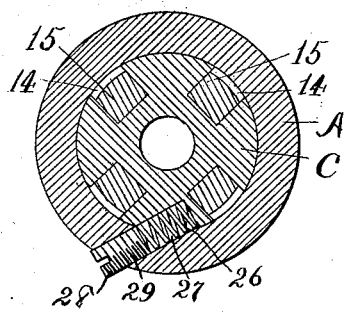
Figure 7:
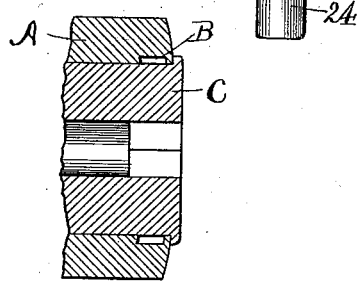
Figure 8:
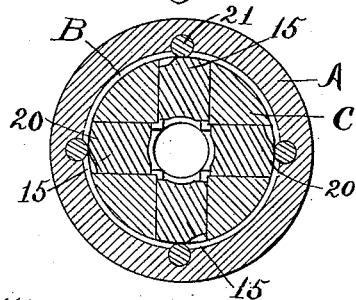
Figure 9:
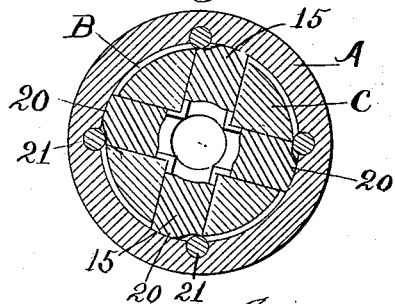

In the accompanying drawings, illustrating my invention, Figure 1 is a central longitudinal section of my device. Fig. 2 is a similar section showing the cutter-heads in released or expanded position, the adjusting-bar being removed. Fig. 3 is a front elevation of same. Figs. 4 and 5 are transverse sectional views on the lines 4 4 and 5 5, respectively, of Fig. 1. Fig. 6 is a transverse section on the line 6 6 of Fig. 2. Fig. 7 is a detail fragmentary section on the line 7 7 of Fig. 5. Fig. 8 is a transverse section on the line 8 8 of Fig. 1. Fig. 9 is a transverse section on the line 9 9 of Fig. 2.

My present invention is designed as an improvement upon the device for which Letters Patent No. 564,700 were granted to me July 28, 1896.

The main object of my present invention is to provide cutter-heads so mounted as to expose them to the minimum wear and likewise so braced and held as to withstand all tortional strains, and likewise to so arrange the entire device as to preclude the possibility of admission of metal shavings or any gritty particles which would interfere with the working of the device.

To this and other ends I provide an outer sleeve or chuck A, which is reduced at one end to form a shank, by means of which it is secured in a lathe. Said sleeve or chuck A is turned out internally to form a perfect cylinder, and at its forward end is provided with an annular recess B. In the rear wall of said sleeve or chuck A pins 1 are mounted, which are adapted to enter a collar 2, fitting within said sleeve, and hold same against relative rotation. Said collar is longitudinally movable on said pins, and is normally held at the forward limit of its movement by means of springs 3, mounted in recesses in said rear wall and bearing against said collar. Said collar 2 is provided with a central screw-threaded opening 4, in which a screw-threaded rod 5 is adapted to fit and by means of which said collar is moved to the rearward limit of its movement against the action of said springs 3. A radial opening 6 is provided in said collar 2, in which a removable plug 7 is mounted. Said opening is screw-threaded above the part containing said plug to receive a set-screw 8, which is adapted to bear against said plug to clamp same firmly upon said rod 5 to hold same firmly in any position to which it has been adjusted. Said set-screw 8 enters said opening 6 through an opening 9 in said sleeve or chuck, which is adapted to be covered by a plate 10, held by a screw 11. Fitting within said sleeve or chuck A is a cylinder C, provided with a central opening 12 to receive the end of said rod 5, which is annularly enlarged, as at 13, to fit said opening. Said cylinder C is provided in its outer face with recesses 14, in which arms 15 are pivotally mounted by means of pins 16, passing through their inner ends. The outer or free ends of said arms 15 are enlarged to provide heads 17, in which cutters 18 are adapted to be adjustably mounted. Said arms 15 are of less thickness adjacent said heads 17 than at their rear ends, so as to allow them pivotal movement in said recesses 14, and are normally held at the outer limits of their movement by means of springs 19, mounted in recesses in said cylinder C and bearing against said arms. Said cylinder C is of less length than said sleeve or chuck A, so that said heads 15 project over the end of same within said chuck A. Said heads 15 are each provided with a shoulder 20, adapted to fit said annular recess B, each of said shoulders having an inclined edge adapted to engage a pin 21, longitudinally mounted in the end of said chuck A and projecting into said recess B. Said pins 21 correspond in number with said heads 15 and are adapted when said cylinder C is turned to engage said shoulders and force same radially inwardly to the inner limits of their movement. Said pins 21 are securely held against movement by means of pins 22, passing through the inner ends of same and through said chuck A. Mounted in the rear end of said cylinder C are two pins or lugs 23, which are adapted to enter openings in said collar 2 when said cylinder is in position to bring said lugs 23 flush with said openings in said collar. Said collar being normally held to bear against said cylinder C by said springs 3, it would obviously spring into engagement as soon as said lugs are so brought into alinement, thus holding said cylinder C against revolution with relation to said chuck A. The relative position of said lugs and the openings in said collar is such that when said cylinder C is turned to force said heads 15 to their inner limits said lugs will be in alinement with said openings and said cylinder C thus locked in position. Said cylinder C is adapted to be turned by means of a handle 24, passing through a slot 25 in said chuck A. Said cylinder C is normally held in the position in which said heads 15 are, at the outer limits of their movement, by means of a spring 26, mounted in a practically tangential recess 27 in said cylinder C and bearing at one end against a screw-plug 28, closing an opening 29 in said sleeve or chuck A in alinement with said recess 27. Said rod 5 passes loosely through the central opening in the shank of said chuck A and is longitudinally movable with said collar 2. By adjusting said rod the length of a screw-thread cut by said cutters is determined, the threaded end of the bolt or rod being screw-threaded, being adapted to bear against the forward end of said rod 5 and force the same rearward until said collar 2 is out of engagement with the lugs 23, whereupon said spring 26 will turn said cylinder C until said shoulders on said heads 15 are out of engagement with said pins 21 and are thus moved to the outer limits of their movement and the cutters released from engagement with the bolt or rod being threaded, thus permitting the latter to be withdrawn. In order to make my device proof against the admission of metal shavings, I have provided a flange on the outer end of said cylinder C, which overlaps the said sleeve or chuck A at its outer end. The said outer end of the latter is turned to a curve whose center coincides with the pivots of said arms, and said heads 15 are likewise so turned as to snugly fit said outer end of said sleeve or chuck, so that they slide upon said surface in constant close contact. The recesses in said cylinder C are cut through at the forward end of the latter to receive the inner portions of said heads 15, and the inner ends of said recesses and said heads are likewise cut to form curved surfaces to retain a close sliding fit to prevent admission of metal shavings.

My device is as simple as possible consistent with perfect operativeness and good wearing qualities.

I claim as my invention—

1. In an open die-head, the combination with an outer sleeve or chuck, and a collar longitudinally movable therein and normally held at the outer limit of its movement by means of springs, of a hollow cylinder revolubly mounted in said outer sleeve and carrying pins adapted to engage said collar, to hold said cylinder against rotation, radially-movable cutter-heads carried by said cylinder, springs adapted to hold said cutter-heads normally at the outer limits of their movement, devices on said outer sleeve adapted to bear against said heads to force same inwardly when said sleeve is turned to engage said collar, and devices carried by said collar and adapted to be engaged by the member being threaded by the cutters to force said collar out of engagement with said cylinder to release said cutter-heads, substantially as described.

2. In an open die-head, the combination with an outer sleeve, a longitudinally-movable clutch carried thereby, an internal annular groove therein, and projections in said grooves, of a cylinder revolubly mounted within said sleeve and provided on its face with longitudinal recesses, arms pivotally mounted in said recesses and carrying cutter-heads at their ends, projections on said cutter-heads adapted to enter said annular groove and to engage the projections therein when said cylinder is turned to force said heads to the inner limits of their movement, springs adapted to hold said heads normally at the outer limits of their movement, devices on said cylinder adapted to be engaged by said clutch to lock said cylinder against rotation when said cutter-heads are at the inner limits of their movement, and devices for releasing said clutch, substantially as described.

3. In an open die-head, the combination with an outer sleeve, a longitudinally-movable clutch carried thereby, an internal annular groove therein, and projections in said grooves, of a cylinder revolubly mounted within said sleeve and provided on its face with longitudinal recesses, arms pivotally mounted in said recesses and carrying cutter-heads at their ends, projections on said cutter-heads, adapted to enter said annular groove and to engage the projections therein when said cylinder is turned to force said heads to the inner limits of their movement, springs adapted to hold said heads normally at the outer limits of their movement, devices on said cylinder adapted to be engaged by said clutch to lock said cylinder against rotation when said cutter-heads are at the inner limits of their movement, devices for releasing said clutch, and a spring interposed between said sleeve and said cylinder for turning the latter to release said cutter-heads when said clutch is released, substantially as described.

4. In an open die-head, the combination with a hollow cylinder provided in its outer face with longitudinal recesses, arms pivotally secured at their rear ends in the rear ends of said recesses, cutter-heads at the forward ends of said arms, and springs adapted to hold said cutter-heads normally at the outer limits of their movement, of a sleeve adapted to receive said cylinder, devices in said sleeve adapted to engage said cutter-heads to force the latter to the inner limits of their movement when said cylinder is turned relatively to said sleeve, a spring interposed between said sleeve and said cylinder for holding the latter normally in position to release said cutter-heads, devices for locking said cylinder in the position in which said cutter-heads are at the inner limits of their movement, and devices operated by the member being cut to release said locking devices, whereby said cutter-heads will release said member being cut, substantially as described.

5. In an open die-head, the combination with a hollow cylinder provided in its outer face with longitudinal recesses, arms pivotally secured at their rear ends in the rear ends of said recesses, cutter-heads at the forward ends of said arms, and springs adapted to hold said cutter-heads normally at the outer limits of their movement, of a sleeve adapted to receive said cylinder, devices in said sleeve adapted to engage said cutter-heads to force the latter to the inner limits of their movement when said cylinder is turned relatively to said sleeve, a spring interposed between said sleeve and said cylinder for holding the latter normally in position to release said cutter-heads, a collar slidingly mounted in said sleeve behind said cylinder, openings in said collar, lugs on said cylinder adapted to register with said openings when said cutter-heads are at the inner limits of their movement, springs adapted to throw said collar into engagement with said lugs, a central screw-threaded opening in said collar, a screw-threaded rod passing therethrough and projecting into said cylinder, and devices for clamping said rod against movement with relation to said collar, said rod being adapted to project into the path of the member being operated upon and to be engaged by the latter to force said collar out of engagement with said lugs to release said cylinder and said cutter-heads, whereby said member operated upon is released, substantially as described.

6. In an open die-head, the combination with two interfitting members, cutter-heads carried by one of said members and devices for operating said cutter-heads, of a clutch carried by one of said members and adapted to engage the other thereof to hold said members against relative rotation, said clutch comprising a collar interposed between said members and held against rotation relative to one of same, a spring for holding said collar normally in position to engage said other member, and devices rigid with said collar and movable with relation to said members, adapted to be engaged by the member being threaded to operate said collar against the action of said spring to release the member engaged thereby, substantially as described.

7. In an open die-head, the combination with two interfitting cylinders revoluble with relation to each other, cutter-heads carried by one of said cylinders and projecting over the ends of both cylinders, said cutter-heads being radially movable with relation to said cylinders and having a pivotal motion, of contact-surfaces on said cylinders and cutter-heads respectively, said contact-surfaces being cut on planes whose center coincides with the pivotal points of said cutter-heads, whereby dust-proof contact is maintained between said cutter-heads and said cylinder ends in all positions of said cutter-heads, substantially as described.

In testimony whereof I affix my signature in presence of two witnesses.

HERMANN KUPSCH.

Witnesses:
RUDOLPH WM. LOTZ,
ARTHUR C. LOTZ.